(12) United States Patent
Kamiya (10) Patent No.: US 7,320,172 B1
(45) Date of Patent: Jan. 22, 2008

(54) APPARATUS FOR POSITIONING INSERTS IN A RECEPTACLE

(75) Inventor: Nobuyuki Kamiya, Knoxville, TN (US)

(73) Assignee: Exedy America Corporation, Mascot, TN (US)

( * ) Notice: Subject to any disclaimer, the term of this patent is extended or adjusted under 35 U.S.C. 154(b) by 353 days.

(21) Appl. No.: 11/032,580

(22) Filed: Jan. 10, 2005

(51) Int. Cl.
*B23Q 7/10* (2006.01)

(52) U.S. Cl. ............................. 29/809; 29/717; 29/771; 29/789; 29/700; 29/464; 29/466; 29/468

(58) Field of Classification Search ............. 29/889.21, 29/889.3, 889.4, 889.5, 717, 771, 789, 700, 29/809, 823, 464, 468, 466
See application file for complete search history.

(56) References Cited

U.S. PATENT DOCUMENTS

| | | | |
|---|---|---|---|
| 3,381,452 A | * | 5/1968 | Gentry et al. .................. 53/393 |
| 3,522,645 A | | 8/1970 | Kennicott |
| 3,631,577 A | * | 1/1972 | Hasegawa et al. ............ 157/1.5 |
| 3,668,773 A | | 6/1972 | Achterberg |
| 3,681,837 A | | 8/1972 | Franklin |
| 3,691,618 A | | 9/1972 | Achterberg et al. |
| 3,866,298 A | * | 2/1975 | Nowak .......................... 29/783 |
| 3,977,062 A | | 8/1976 | Wallman |
| 4,035,900 A | * | 7/1977 | Boyko et al. ................... 29/795 |
| 4,437,213 A | | 3/1984 | Reese et al. |
| 4,603,773 A | * | 8/1986 | Ducate, Sr. ................ 198/468.2 |
| 4,653,635 A | * | 3/1987 | Ducate, Sr. ................ 198/468.4 |
| 4,774,759 A | * | 10/1988 | Makoto et al. ................. 29/741 |
| 4,784,256 A | * | 11/1988 | Ducate, Sr. ................ 198/468.4 |
| 5,065,509 A | * | 11/1991 | Sahashi .................... 29/889.21 |
| 5,109,604 A | * | 5/1992 | Koebele ...................... 29/889.5 |
| 5,195,236 A | * | 3/1993 | Miechowicki ................ 29/818 |
| 5,257,442 A | | 11/1993 | Tanaka et al. |
| 5,906,041 A | * | 5/1999 | Ito et al. ........................ 29/809 |
| 6,041,500 A | | 3/2000 | Terpstra |
| 6,061,886 A | * | 5/2000 | Nitta et al. ................. 29/23.51 |

FOREIGN PATENT DOCUMENTS

JP    2002-266981    9/2002

* cited by examiner

*Primary Examiner*—Essama Omgba
(74) *Attorney, Agent, or Firm*—Luedeka, Neely & Graham, P.C.

(57) ABSTRACT

An apparatus for positioning inserts in a rotating receptacle. The apparatus includes a magazine for holding a plurality of inserts. An insertion arm is provided for positioning inserts within the receptacle. The insertion arm has a first end and a second end, wherein the second end comprises an insert receiving structure. A first linear actuation device moves the insertion arm between a first linear position and a second linear position. In the first linear position, the insert receiving structure picks an insert from the magazine. A second linear actuation device is connected to the insert receiving structure. When the insertion arm is in the second position, the second linear actuation device causes the insert receiving structure to rotate from about 0° to about 90° to position the insert within the receptacle.

20 Claims, 6 Drawing Sheets

APPARATUS FOR POSITIONING INSERTS IN A RECEPTACLE

FIELD

The disclosure relates to an apparatus for assembling torque converters. More particularly, the disclosure provides to an apparatus for automatically positioning blades in a torque converter assembly.

BACKGROUND

Torque converters are fluid couplings used in vehicle automatic transmissions which allow the engine on a vehicle to spin independently of a transmission. Torque converter assemblies typically include a turbine and a pump, wherein the overall shape of the torque converter assembly is substantially similar to a hollow donut. The pump of the torque converter comprises a drum forming half of the hollow donut-shape, if the donut where split in half along the centerline of the circumference of the donut. The turbine drum comprises the second half of the hollow donut-shape.

The pump is a type of centrifugal pump. The pump is connected to the flywheel of an engine, and turns at the same speed as the flywheel. The pump includes fins located within a drum, where the fins impart force to a fluid within the pump. As the pump spins, fluid is forced to an outer circumference of the drum, where the fluid enters the turbine. The turbine includes blades located within the turbine drum, where the blades are configured to oppose the configuration of the fins of the pump. As the fluid enters the turbine, it imparts force to the blades of the turbine, causing the turbine to spin. Thereby, the turbine causes the transmission to spin, which basically moves a vehicle.

Figure 1:
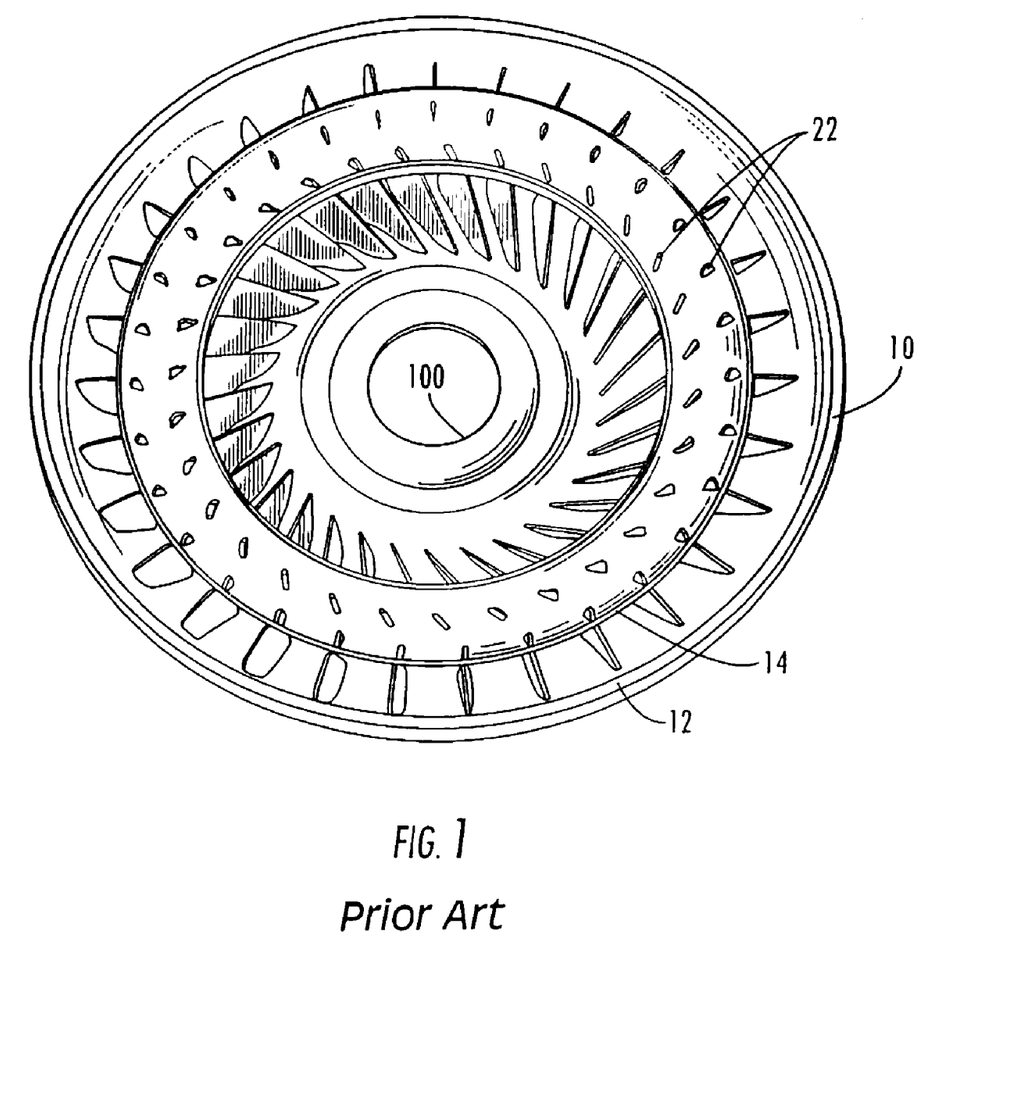
FIG. 1 is a perspective view of a torque converter drum containing blades.
Figure 2:
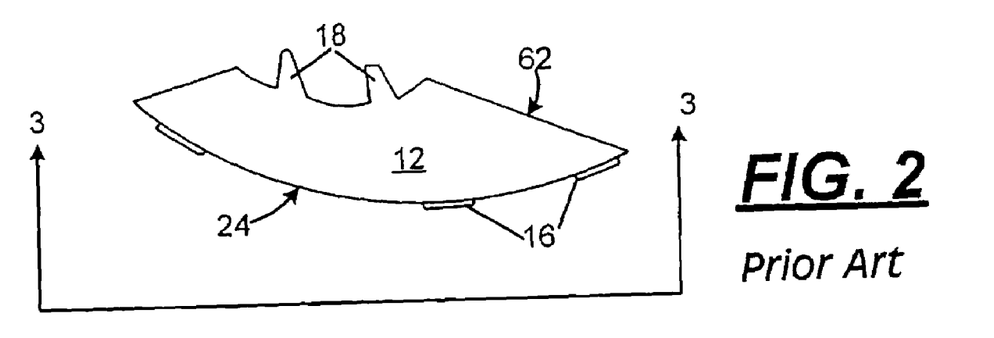
FIG. 2 is a plan view of a blade for a torque converter drum.
Figure 3:
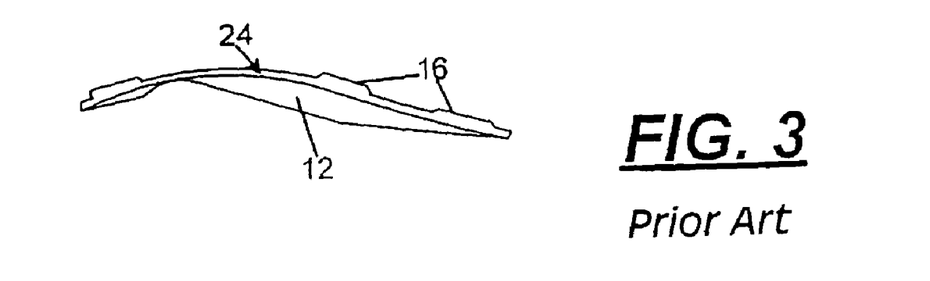
FIG. 3 is a bottom perspective view of the blade of FIG. 2

The blades and fins (hereinafter "blades") of a torque converter are typically curved in three dimensions and placed in the pump and turbine in non-radial positions. The blades include projections which fit into slots in the pump and turbine drums. A typical blade is shown in FIGS. 2 and 3 and a turbine with the blades inserted is shown in FIG. 1. Placement of blades into the drums has created many logistical problems for torque converter manufacturers, due to their unusual configuration and due to the fact that the projections on the blades must be firmly inserted into the slots in the drums. The blades often have a three dimensional profile that requires intricate maneuvering of the blade to correctly position the blade in the drum. Many attempts have been made to create apparatus which automate the process of blade insertion. However, such apparatus is typically slow and prone to error. Due to the problems associated with such apparatus, the blades are typically inserted into the drums by hand. While hand placement insures correct insertion, the process is relatively slow and is manpower intensive.

What is needed, therefore, is an automated apparatus for placing blades into drums which is efficient and substantially error-free, while also being simple in design.

SUMMARY

With regard to the above and other objects and advantages, the disclosure provides an apparatus for positioning inserts in a rotating receptacle. The apparatus includes a magazine for holding a plurality of inserts. An insertion arm is provided for positioning inserts within the receptacle. The insertion arm has a first end and a second end, wherein the second end comprises an insert receiving structure. A first linear actuation device moves the insertion arm between a first linear position and a second linear position. In the first linear position, the insert receiving structure picks an insert from the magazine. A second linear actuation device is connected to the insert receiving structure. When the insertion arm is in the second position, the second linear actuation device causes the insert receiving structure to rotate through an angle ranging from about 0° to about 90° to position the insert within the receptacle.

In another embodiment there is provided an apparatus for placing blades into a torque converter drum. The apparatus includes a magazine for holding a plurality of blades; and an insertion arm for positioning the blades within the drum, whereby a blade is moved from a magazine loading position to a position within the drum along one linear axis and one rotational axis.

In yet another embodiment there is provided an apparatus for rotating an automatic transmission drum during a drum manufacturing process. The apparatus includes a substantially circular drum holding device with a plurality of teeth located about a perimeter of the drum holding device. The teeth include a first portion at a first angle and a second portion at a second angle. A linear actuation device moves a block having at least first and second projections thereon, such that when the linear actuation device is actuated in a first direction, the first projection contacts the first portion of the teeth, thereby causing the drum rotation mechanism to rotate, and when the linear actuation device is actuated in a second direction, the second projection contacts the second portion of the teeth, thereby causing the drum rotation mechanism to rotate. A vibration damper is provided on the apparatus for preventing unwanted vibrations or movement of the drum upon rotational movement thereof.

An advantage of the embodiments of the disclosure is that the apparatus can precisely place a three-dimensional blade in a fixed position within a drum with very little movement from a magazine feed location to the desired location in a drum. Because the movement of the blade is limited, the tolerance limits for positioning the blade are easier to maintain and the blades can be installed in a drum in much less time than with apparatus that includes greater, more intricate movement for installing the blades.

BRIEF DESCRIPTION OF THE DRAWINGS

Further advantages of the disclosed embodiments may be apparent by reference to the detailed description when considered in conjunction with the figures, which are not to scale so as to more clearly show the details, wherein like reference numbers indicate like elements throughout the several views, and wherein.

DETAILED DESCRIPTION

With reference to FIG. 1, there is shown in perspective view a portion of a torque converter drum 10 containing a plurality of blades 12 disposed in the drum 10. The blades 12 are retained in the drum by a blade retaining ring 14.

The blades 12 have a generally three-dimensional profile as seen in FIGS. 2 and 3. Tabs 16 and 18 are located on opposing edges of the blades 12. The tabs 16 fit into hollow trenches 20 in the drum 10 (FIG. 4) while tabs 18 fit into slots 22 in the retaining ring. During manufacture of the drum 10, the blades 12 must be precisely positioned within the drum 10 so that the slots 22 of the retaining ring 14 capture the tabs 18. It will be appreciated that the hollow trenches 20 for tabs 16 are not sufficient to retain the blades 12 in the drum 10 if the drum 10 is excessively vibrated during assembly of the blades 12. A mechanism for reducing excessive vibration of the drum 10 is described below.

Figure 4:
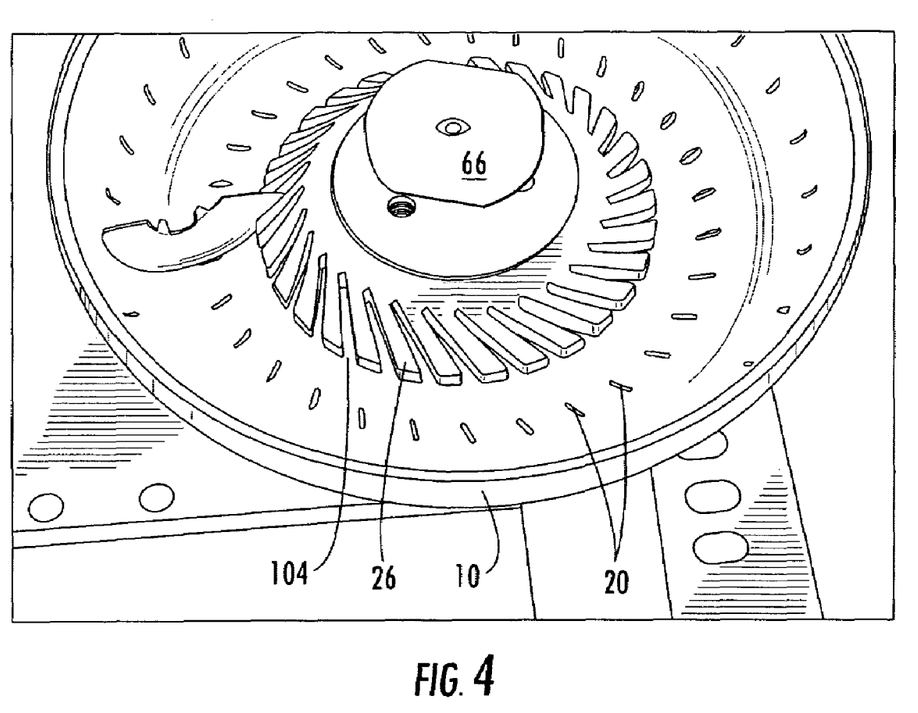
FIG. 4 is a perspective view of a drum for inserting blades therein.

The curved edge 24 of the blades 12 requires that a slight rotational movement be provided to properly insert the blades 12 into the drum 10. During assembly of the blades 12 in the drum, a blade placement form 26 is placed in the drum 10. The blade placement form 26 is removed after the blades 12 are tapped into a locking position in the drum 10 and the retaining ring 14 is attached to the drum 10.

With reference now to FIGS. 5-8, there is shown an automated blade insertion apparatus 30 in accordance with a preferred embodiment of the disclosure. The apparatus 30 includes a stationary support frame 32, a plurality of linear actuation devices 34, 36, and 38, a magazine 40 for holding blades 12 to be inserted in the drum 10, a blade insertion arm 42, and a rotating mechanism 44 for holding and rotating a torque converter drum 10 during a blade insertion process.

The frame 32 provides support for the drum rotating mechanism 44 and for the linear actuation devices 34, 36 and 38. Accordingly, the frame 32 has a horizontal support section 46 and a vertical support section 48. The rotating mechanism 44 is disposed on the horizontal support section 46 and the activation devices 34, 36, and 38 are disposed on the vertical support section 48 of the frame 32. Adjustment mechanisms may be provided on the frame for leveling the horizontal and vertical support sections 46 and 48 when the frame is placed on an uneven surface. As described in more detail below, the frame also includes vibration isolation devices that reduce unwanted drum vibration during a blade insertion step.

The first linear actuation device 34 is attached to the vertical support section 48 of the frame 32 and moves the blade insertion arm 42 from a first position adjacent the blade magazine 40 in a substantially linear direction to a second position toward the drum 10. Accordingly, the first linear actuation device 34 acts as the primary drive mechanism for the automated blade insertion apparatus 30 and is preferably a pneumatic cylinder, but may be any type of linear actuation device, such as a hydraulic cylinder or a mechanized device providing a substantially linear movement upon activation. In a preferred embodiment, the first linear actuation device 34 is disposed on the vertical support section 48 of the frame 32 in a substantially perpendicular orientation with respect to the torque converter drum 10. However, the linear actuation devices may also be at any angled relationship required for correct placement of blades 12 into the torque converter drum 10.

The magazine 40 is also attached to the vertical support section 48 of the frame 32 and holds a plurality of blades 12 for insertion into the drum 10. Blades 12 are fed by gravity from the magazine 40 to a position adjacent the blade insertion arm 42 when the blade insertion arm is in the first position. A blade retaining device, described in more detail below, is provided on the blade insertion arm 42 for selectively picking a blade 12 from the magazine 40 for insertion into the drum 10.

Accordingly, the blade insertion arm 42 includes a fixed portion 50 and a movable portion 52. After the first linear actuation device 34 moves the blade insertion arm 42 to the second position, the second actuation device 36 is activated to rotate the movable portion 52 of the blade insertion arm 42 through an angle ranging from about 0° to about 90°, typically from about 15° to about 45°, for proper placement of the blades 12 into the drum 10. The minor rotational movement of the movable portion 52 enables each blade 12 to be properly positioned within a drum 10 with repeatable accuracy and speed. It will thus be appreciated that only two linear actuation devices 34 and 36 are required for placing each blade 12 in a drum 10.

When the blade insertion arm 42 is in the first position, a blade retaining device 54 (FIG. 6) located on the movable portion 52 of the blade insertion arm 42 is substantially adjacent the blade 12 in the magazine 40. The blade retaining device 54 is preferably shaped substantially similar to a blade 12. The device 54 may have a magnetic or removably adhesive surface for picking the blade 12 from the magazine 40 when the insertion arm 42 is in the first position. A magnetic retaining device 54 is desirably used, wherein the device may be a permanent or electromagnetic device. When the retaining device 54 is magnetic, a metallic blade 12 is magnetically removed from the magazine 40 and drawn to and retained adjacent the magnetic retaining device 54.

Figure 6:
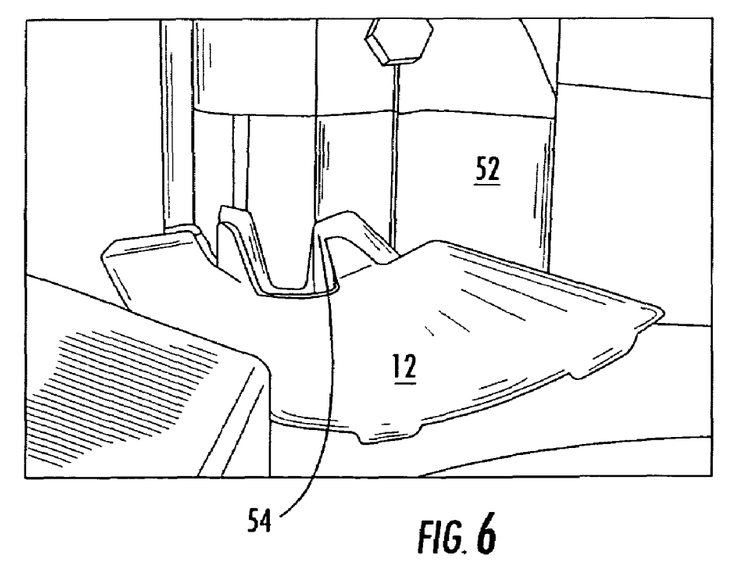
FIG. 6 is a plan view of a movable portion of an apparatus for inserting blades in a drum according to the disclosure.

After a blade 12 is picked from the magazine 40, the first linear actuation device 34 actuates, moving the insertion arm 42 to the second position. The second linear actuation device 36 then actuates from the first position adjacent the blade magazine 40 to the second position wherein the blade 12 is disposed in the trenches 20 in the drum 10. The second linear actuation device 36 is preferably a pneumatic cylinder, but may be any type of linear actuation device, such as a hydraulic cylinder or a mechanized device providing an axial movement upon activation.

The second linear actuation device 36 is attached on one end thereof to the first linear actuation device 34 for movement with the insertion arm 42. An actuation rod 56 is provided on an opposing end of the second linear actuation device 36. The actuation rod 56 is attached to the movable portion 52 of the insertion arm 42. When the second linear actuation device 36 activates from a first position to a second position, the rod 56 causes the movable portion 52 to rotate about an axis substantially perpendicular to the linear movement of the rod 56. When the movable portion 52 of the insertion arm 42 is located at the second position, the blade 12 is disposed in a correct position within the torque converter drum 10.

Figure 7:
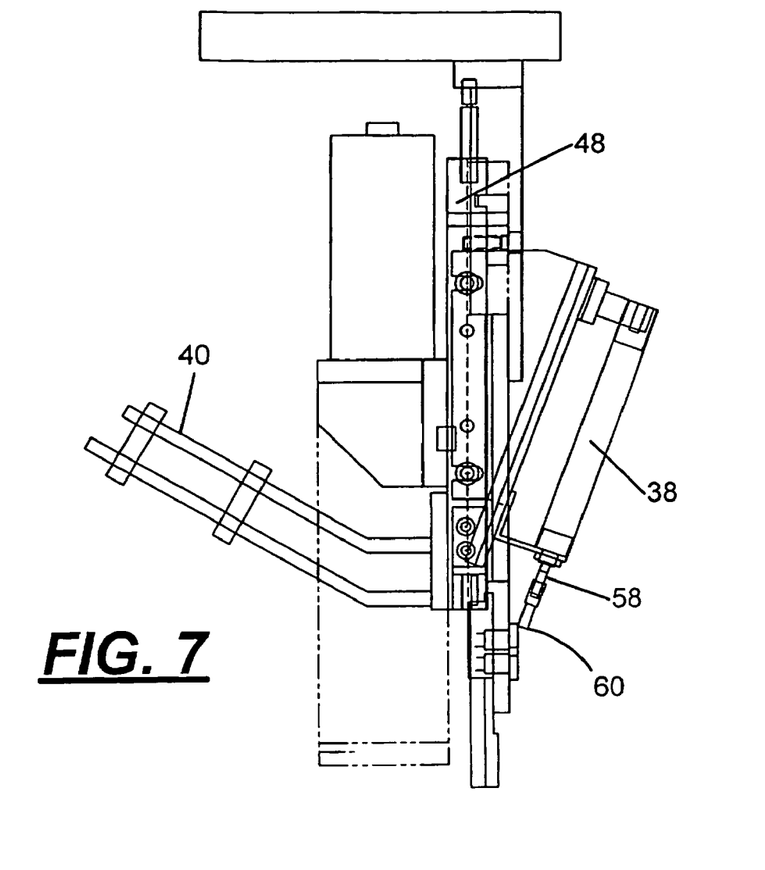
FIG. 7 is an elevational view of a portion of an apparatus for inserting blades in a drum according to the disclosure.
Figure 8:
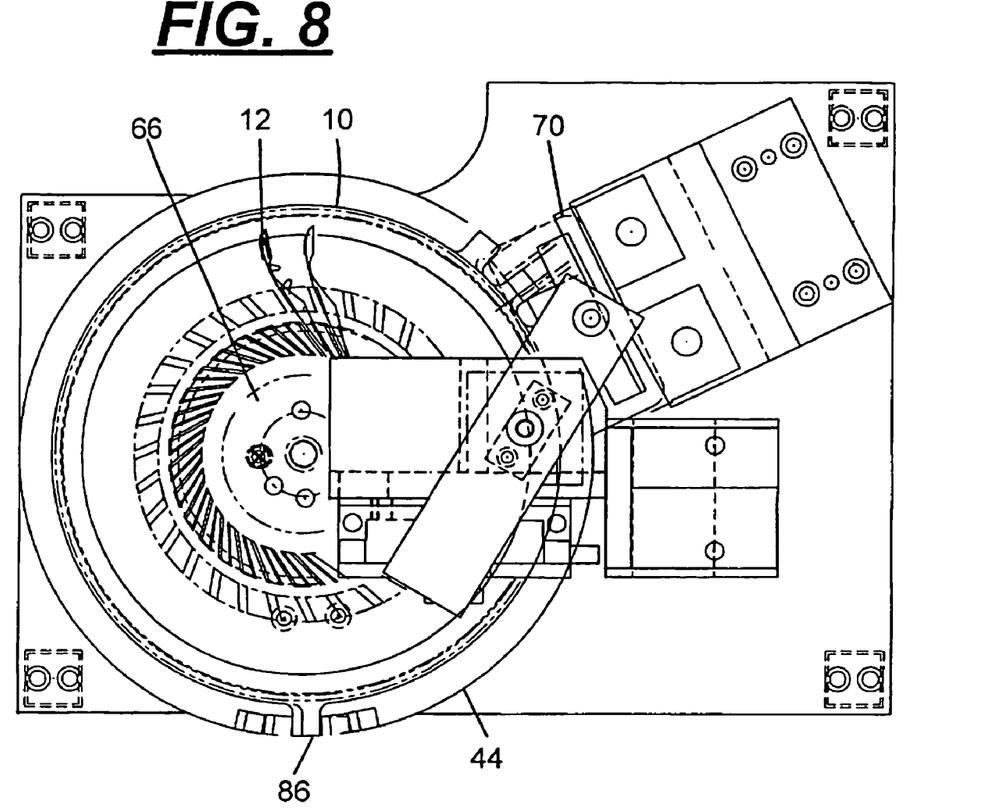
FIG. 8 is a top plan view of a blade insertion apparatus according to the disclosure.

Upon proper placement of the blade 12 in the drum 10, the third linear actuation device 38 is activated. The third linear actuation device 38 is attached to the frame 32 and includes an extensible rod 58 (FIG. 7). As with the first and second linear activation devices 34 and 36, the third linear actuation device 38 is preferably a pneumatic cylinder, but may be any other type of linear actuation device, such as a hydraulic cylinder or a mechanized device. An end 60 of the rod 58 is disposed adjacent an edge 62 (FIG. 2) of the blade 12 when the rod 58 is in a second position and the blade 12 is disposed in the drum 10. As the insertion arm 42 moves from the second position to the first position adjacent the magazine 40, the end of the rod 60 holds the blade 12 in the drum thereby detaching the blade 12 from the blade retaining device 54. Accordingly, the movable portion 52 may then move back to a first rotational position without removing the blade 12 from the drum 10.

In an alternative embodiment, an electromagnet is provided as the retaining device 54. Upon proper insertion of the blade 12 in the drum 10, a current to the electromagnet is discontinued and insertion arm 42 may then move from the second position to the first position without removing the blade 12 from its position in the drum 10.

After the second linear actuation device 36 actuates from the second position to the first position, moving the movable portion 52 back to the first rotational position, the third linear actuation device 38 actuates and moves the rod 58 from the second position adjacent the edge 62 of the blade 12 to the first position, leaving the blade 26 at the correct position within the drum 10. The first linear actuation device also actuates from the second position to the first position moving the insertion arm 42 to adjacent the blade magazine 40. The blade retaining device 54 of the insertion arm 42 is then in position to pick another blade 12 from the magazine 40 in order to place another blade 12 within the torque converter drum 10.

It will be appreciated that the rod 58 applies sufficient force to the edge 62 of the blade 12 to retain the blade 12 in the drum 10. In another alternative embodiment, the rod 58 applies a force to the edge 62 of the blade 12 to forcibly insert the blade tabs 16 into the trenches 20 in the drum 10. The force applied by the rod end 60 of the third actuation device 38 may be in the nature of a hammering force rather than simply a retaining movement of the rod end 60 against the edge 62 of the blade.

As set forth above, the rotation mechanism 44 for rotating the torque converter drum 10 is also attached to the base 32. The rotation mechanism provides an indexable rotation of the drum 10 so that a full set of blades 12 may be inserted into the correct positions within the drum 10. The drum 10 is attached to the rotation mechanism 44 by a retaining device 66. In a preferred embodiment, the rotation mechanism 44 is driven by the first linear actuation device 34 so that movement of the device 34 from the first position to the second position indexes the drum 10 at least a portion if the distance required between adjacent blades 12. An indexing device 70 (FIG. 8) for moving the rotation mechanism 44 includes a plate 72 attached for movement with the insertion arm 42 as the insertion arm 42 moves from the first position to the second position.

Figure 9:
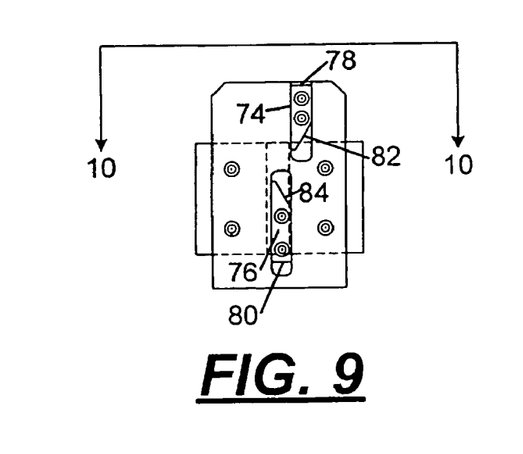
FIG. 9 is an elevational view of a plate for indexing a drum rotation mechanism for a blade insertion apparatus according to the disclosure.
Figure 10:
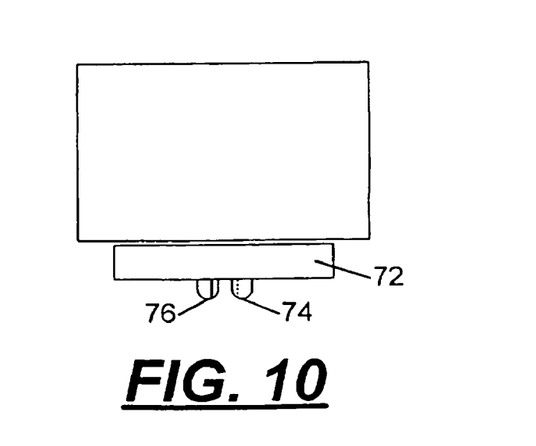
FIG. 10 is a top plan view of the plate of FIG. 9.

With reference to FIGS. 9 and 10, the plate 72 preferably comprises a first projection 74 and a second projection 76. The first and second projections 74 and 76 each include a square end 78 and 80 respectively and an angled end 82 and 84 respectively. The angled end 82 of the first projection 74 is substantially facing the angled end 84 of the second projection 76. The angled ends 82 and 84 of the first and second projections 74 and 76 are configured to engage portions of teeth 86 on the drum rotation mechanism 44. In alternate embodiments, the projections 74 and 76 may have any configuration capable of engaging the teeth 86 of the rotation mechanism 44 and any number of projections 74 and 76 may be used.

Figure 11:
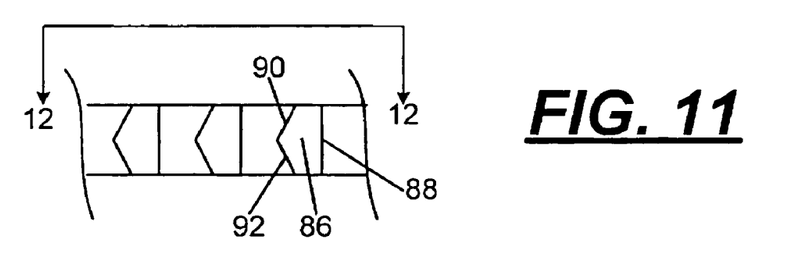
FIG. 11 is an elevational view of a portion of a rotation mechanism for an apparatus according to the disclosure.
Figure 12:
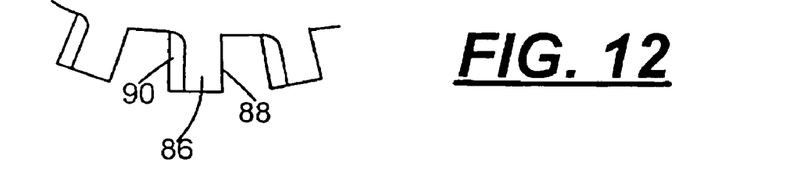
FIG. 12 is a top plan view of the portion of the rotation mechanism of FIG. 11.

The rotation mechanism 44 holds the torque converter drum 10 in a fixed orientation relative the rotation mechanism 44. Preferably, the rotation mechanism 44 is substantially circular with a plurality of teeth 86 disposed about its circumference. The number of teeth 86 is preferably the same as the number of blades 12 to be inserted into the drum 10. Each of the teeth 86 has two sides, wherein one side comprises a substantially vertical portion 88 and an opposing side comprises angled portions 90 and 92 (FIGS. 11-12).

The angled end 82 of the first projection 74 of the plate 72 is configured to engage the angled portion 90 of the teeth 86 and the angled end 84 of the second projection 76 is configured to engage the angled portion 92 of the teeth 86. When the first linear actuation device 34 is actuated from the first position to the second position, the first projection 74 contacts the first portion 90 of the teeth 86 and creates a force which causes the rotation mechanism 44 to rotate a predetermined amount. When the first linear actuation device 34 is actuated from the second position to the first position, the second projection 76 contacts the angled portion 92 of the teeth 86 which likewise creates a force which causes the rotation mechanism 44 to rotate a predetermined amount. The total rotation caused by the first projection 74 and the second projection 76 is the distance between adjacent blades 12 in the torque converter drum 10. Accordingly, first linear actuation device 34 acts as the primary mechanism for blade insertion and for indexing the drum 10 a predetermined amount for blade insertion. Hence, there is provided a simple integrated mechanism for efficiently and quickly inserting blades 12 in a torque converter drum 10.

Although the above rotation mechanism 44 is the preferred mechanism for use with the blade insertion apparatus 30, any suitable rotation mechanism may be used for rotating the drum 10 to allow a plurality of blades 12 to be inserted. For example, the rotation mechanism 44 may be actuated by a stepper motor or any other actuation device that can rotate a torque converter drum 10 an incremental amount for blade insertion.

With respect to the above, movement of the linear actuation devices 34, 36, and 38 and rotation mechanism 44 tend to cause significant vibration during the blade insertion process. Without use of vibration isolation mechanisms, such vibration will transfer to the torque converter drum 10 and can cause previously placed blades to move out of the correct position within the drum 10 until the blades 12 are fixedly attached to the drum 10, as by force, brazing, welding, and the like. Therefore, in a preferred embodiment, vibration dampers 94 are used to prevent excessive vibration during the blade insertion process. Preferably, vibration dampers 94 are placed between the frame 32 and the first linear actuation device 34. Suitable vibration dampers may include foam blocks, cushions, shock absorbers and the like. The entire frame 32 may be attached to a vibration absorbing pad or base to reduce the vibrations in the apparatus 30 caused by linear movement of the linear actuation devices 34, 36, and 38.

Further, a friction pad 96 connects to the drum rotation mechanism 44 to reduce excess movement of the drum rotation mechanism 44 during an indexing operation. The friction pad 96 may also reduce vibration to the torque converter drum 10. Other vibration damping devices may be used as needed. The vibration dampers 94 and friction pad 96 insure that the torque converter drum 10 can processed with a full set of blades 12 without disturbing the set of blades 12 from their placed locations in the drum 10.

The apparatus 30 described above, preferably inserts blades 12 into a single drum 10 within a short period of time. The drums 10 are preferably inserted into the blade insertion apparatus 30 by hand. However, in alternate embodiments, blades 12 may be inserted into multiple drums 10 simultaneously and the placement of drums 10 into the apparatus 30 may be automated.

Figure 5:
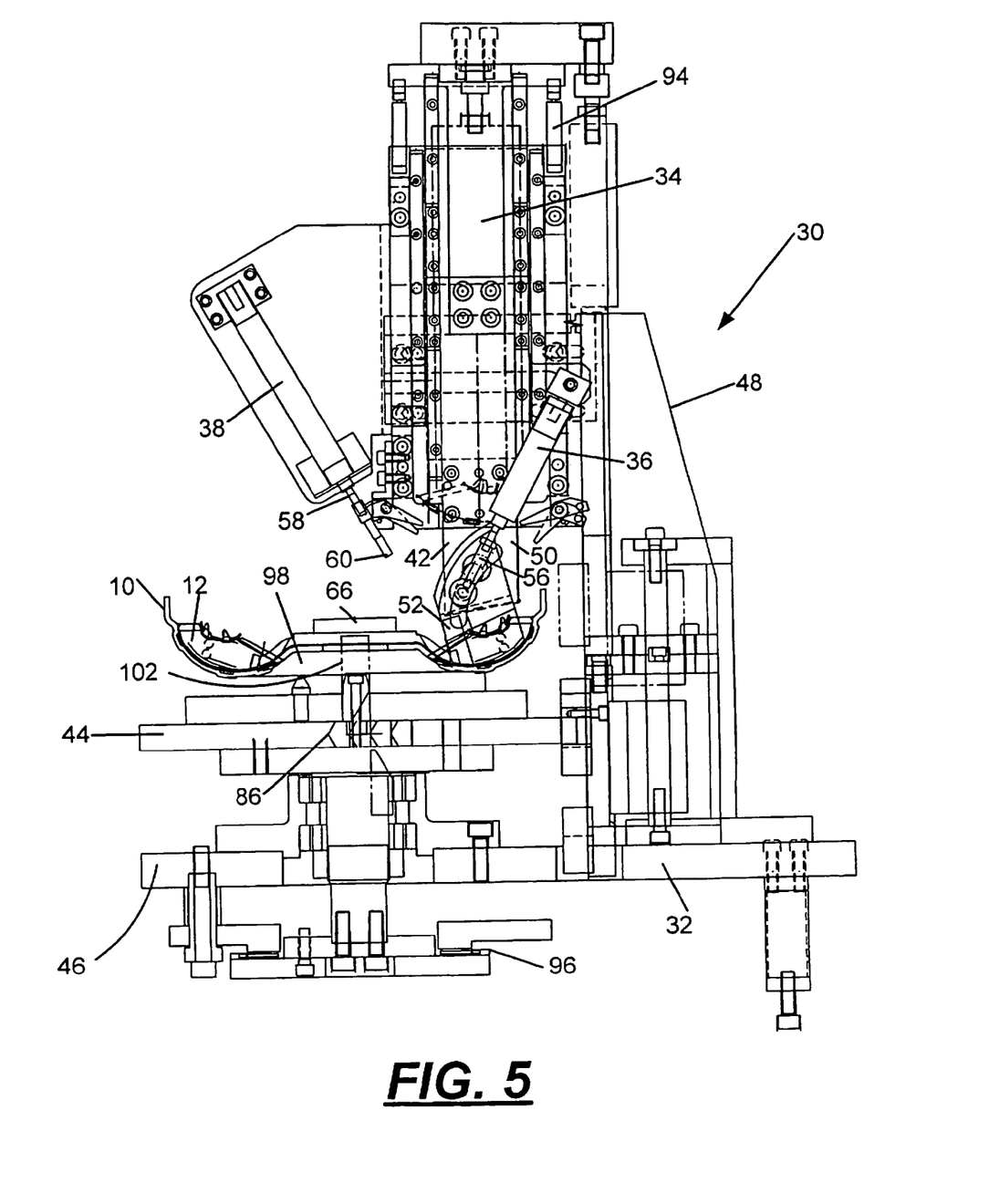
FIG. 5 is an elevational view of an apparatus for automatically inserting blades according to the disclosure.

In order to insert the drum 10 onto the rotation mechanism, the drum 10 is first placed onto a drum holding plate 98 of the rotation mechanism 44 (FIG. 5). A central opening 100 in the drum 10 is placed over a shaft 102 on the drum rotation mechanism 44. The retaining device 66 is then attached to the shaft 102 and holds the drum 10 between the holding plate 98 and the retaining device 66. The drum 10 is thereby held in position on the drum rotation mechanism 44.

The retaining device 66 may engage the shaft 102 and drum 10 by a variety of methods, including, but not limited to, threaded engagement, a keyed relationship, a spring loaded mechanisms, or any other suitable engagement method. In a preferred embodiment, the clamping mechanism includes the blade placement form 26 (FIG. 4) for clamping and assisting with the insertion of blades 12 into the drum 10. The blade placement form 26 comprises a plurality of slots 104, wherein each slot 104 corresponds to a blade position. The slots 104 assist in holding the blades 12 in the correct position within the drum 10 during the insertion process.

In a preferred embodiment, after all of the blades 12 have been placed in the correct position in the drum 10, the drum 10 is removed from the automated blade insertion apparatus 30 by removing the clamping mechanism. Although the presently described apparatus correctly places the blades 12 in position in the drum 10, the blades 12 are not permanently attached to the drum 10.

In order to permanently attach the blades 12 in the drum 10, the drum 10 is placed into a machine that knocks the tabs 16 of each of the blades 12 firmly into the trenches 20 in the drum 10. However, in an alternate embodiment, actuation device 38 eliminates the need for a second machine. In the alternate embodiment, the third linear actuation device 38 not only removes the blade 12 from the movable portion 52 of the insertion arm 42, but also provides the force necessary to knock the tabs 16 of the blades 12 into their respective trenches 20 in the drum 10. Such force is provided by moving the rod end 60 against the blade edge 62 with a force greater than a force required to remove the blade 12 from the movable portion 52 of the insertion arm 42. In such a manner, the blades 12 are substantially fixedly attached to the torque converter drum 10.

An important feature of the embodiments is the speed with which blades 12 can be placed in a drum 10. A typical torque converter drum 10 contains 31 blades. By hand, it takes approximately 90 seconds for an experienced person to insert all 31 blades 12 into the drum 10. By contrast, the foregoing mechanism 30 may be able to insert 31 blades 12 into a drum 10 in less than about 60 seconds.

While the above description is directed to the assembly of torque converters, the above apparatus may be useful for the manufacture of any device requiring blade insertion. For example, the above apparatus may be useful for the manufacture of jet engine, gas turbines, or other type of turbine.

The foregoing description of preferred embodiments for of the disclosure has been presented for purposes of illustration and description. The disclosure is not intended to be exhaustive or to limit the disclosed embodiments to the precise form disclosed. Obvious modifications or variations are possible in light of the above teachings. The embodiments are chosen and described in an effort to provide the best illustrations of the principles and features of the apparatus and its practical application, and to thereby enable one of ordinary skill in the art to utilize the apparatus in various embodiments and with various modifications as is suited to the particular use contemplated. All such modifications and variations are within the scope of the disclosure as determined by the appended claims when interpreted in accordance with the breadth to which they are fairly, legally, and equitably entitled.

What is claimed is:

1. An apparatus for positioning inserts in a rotating receptacle, the apparatus comprising:
    a magazine for holding a plurality of inserts;
    an insertion arm for positioning inserts within the receptacle, the insertion arm having a first end and a second end, wherein the second end comprises an insert receiving structure;
    a first linear actuation device for moving the insertion arm between a first linear position and a second linear position, wherein the insert receiving structure picks an insert from the magazine at the first linear position; and
    a second linear actuation device connected to the insert receiving structure, such that when the insertion arm is in the second position, the second linear actuation device causes the insert receiving structure to rotate through an angle ranging from about 0° to about 90° to position the insert within the receptacle.

2. The apparatus of claim 1 further comprising an insert removal device for removing the insert from the insert receiving structure.

3. The apparatus of claim 2 wherein the insert removal device comprises a third linear actuation device.

4. The apparatus of claim 2, wherein the insert removal device functions as a hammering mechanism for forcing the insert into a substantially locked position within the receptacle.

5. The apparatus of claim 1, wherein the second linear actuation device causes the insert receiving structure to rotate from about 15' to about 45° to position the insert within the receptacle.

6. The apparatus of claim 1, wherein the first and second linear actuation devices comprise hydraulically actuated cylinders.

7. The apparatus of claim 1, wherein the linear actuation devices comprise pneumatically actuated cylinders.

8. The apparatus of claim 1, wherein the insert receiving structure comprises a magnetic portion for removing inserts from the magazine.

9. The apparatus of claim 1, further comprising a receptacle rotation mechanism for rotating the receptacle, thereby allowing a plurality of inserts to be positioned within the receptacle.

10. The apparatus of claim 9, wherein the receptacle rotation mechanism is driven by the first linear actuation device.

11. The apparatus of claim 9, wherein the receptacle rotation mechanism comprises a substantially circular receptacle holding device having a plurality of teeth located about a perimeter of the receptacle holding device, wherein the teeth comprise a first portion at a first angle and a second portion at a second angle, and wherein the first linear actuation device moves a block having at least first and second projections, such that when the first linear actuation device moves the insertion arm in a first direction, the first projection contacts the first portion of the teeth, thereby causing the receptacle rotation mechanism to rotate, and when the first linear actuation device moves the insertion arm in a second direction, the second projection contacts the second portion of the teeth, thereby causing the receptacle rotation mechanism to rotate to a preselected position for insertion of an insert.

12. The apparatus of claim 9, wherein the receptacle rotation mechanism further comprises a friction pad to limit over rotation of the receptacle.

13. The apparatus of claim 1, further comprising vibration dampers to limit vibration of the receptacle during actuation of the insertion arm.

14. An apparatus for placing blades into a torque converter drum comprising:

a magazine for holding a plurality of blades;

an insertion arm for positioning the blades within the drum, whereby a blade is moved from a magazine loading position to a position within the drum along one linear axis and one rotational axis; and a first actuation device for moving the insertion arm between a first position and a second position, wherein a blade receiving structure on the insertion arm picks a blade from the magazine at the first position, and a second actuation device connected to the blade receiving structure, such that when the insertion arm is in the second position, the second actuation device causes the blade receiving structure to rotate and position the insert within the receptacle.

15. The apparatus of claim 14, further comprising a blade removal device for removing the blade from the blade receiving structure.

16. The apparatus of claim 15, wherein the blade removal device comprises a third actuation device.

17. The apparatus of claim 15, wherein the blade removal device functions as a hammering mechanism for forcing the insert into a substantially locked position within the drum.

18. The apparatus of claim 14, wherein the actuation devices comprises cylinders selected from hydraulic cylinders and pneumatic cylinders.

19. The apparatus of claim 14, wherein the blade receiving structure comprises a magnetic portion for removing blades from the magazine.

20. An apparatus for placing blades into a torque converter drum comprising:

a magazine for holding a plurality of blades;

an insertion arm for positioning the blades within the drum, whereby a blade is moved from a magazine loading position to a position within the drum along one linear axis and one rotational axis; and a drum rotation mechanism for rotating the drum, thereby allowing a plurality of blades to be positioned with the drum, the drum rotation mechanism comprising a substantially circular drum holding device having a plurality of teeth located about a perimeter of the drum holding device, wherein the teeth comprise a first portion at a first angle and a second portion at a second angle, and further wherein a linear actuation device moves a block having at least first and second projections, such that when the linear actuation device moves the insertion arm in a first direction, the projection contacts the first portion of the teeth, thereby causing the drum rotation mechanism to rotate, and when the linear actuation device moves the insertion arm in a second direction, the second projection contacts the second portion of the teeth, thereby causing the drum rotation mechanism to rotate.

* * * * *